US012689973B2

(12) United States Patent
Zhang et al.

(10) Patent No.: US 12,689,973 B2
(45) Date of Patent: Jul. 21, 2026

(54) NETWORK SELECTION METHOD AND APPARATUS, DEVICE, AND STORAGE MEDIUM

(71) Applicant: VIVO MOBILE COMMUNICATION CO., LTD., Dongguan (CN)

(72) Inventors: Pengfei Zhang, Dongguan (CN); Lufeng Han, Dongguan (CN); Yanchao Kang, Dongguan (CN); Xuanbing Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 427 days.

(21) Appl. No.: 18/340,163

(22) Filed: Jun. 23, 2023

(65) Prior Publication Data

US 2023/0337128 A1     Oct. 19, 2023

Related U.S. Application Data

(63) Continuation of application No. PCT/CN2021/142061, filed on Dec. 28, 2021.

(30) Foreign Application Priority Data

Dec. 29, 2020     (CN) .......................... 202011593449.5

(51) Int. Cl.
*H04W 48/18*          (2009.01)
*H04W 76/19*          (2018.01)

(52) U.S. Cl.
CPC ........... *H04W 48/18* (2013.01); *H04W 76/19* (2018.02)

(58) Field of Classification Search
CPC ....... H04W 4/90; H04W 24/04; H04W 48/02; H04W 48/10; H04W 48/16; H04W 48/18; H04W 76/19; H04W 76/50
(Continued)

(56) References Cited

U.S. PATENT DOCUMENTS

| | | | |
|---|---|---|---|
| 10,779,230 B1 * | 9/2020 | Sethi | ...................... H04W 60/04 |
| 2005/0037755 A1 * | 2/2005 | Hind | ..................... H04W 48/18 |
| | | | 455/435.3 |

(Continued)

FOREIGN PATENT DOCUMENTS

| | | |
|---|---|---|
| CN | 102006556 A | 4/2011 |
| WO | 2019213912 A1 | 11/2019 |

(Continued)

OTHER PUBLICATIONS

3GPP TSG-SA WG1 Meeting #86, S1-191101, Suzhou, China, May 6-10, 2019. Huawei. Use case for HPLMN completely failure.

(Continued)

*Primary Examiner* — Jean A Gelin

(74) *Attorney, Agent, or Firm* — The Webb Law Firm

(57)          ABSTRACT

This application discloses a network selection method and apparatus, a device, and a storage medium, and belongs to the field of communication technologies. The method includes: obtaining, in a case that fault occurs on a first network of the terminal, disaster condition DC information from a target network; and performing network selection based on the DC information, where the target network includes: the first network and/or a second network, where the first network is a network that does not exist in a forbidden network list of the terminal; and the second network is a network that exists in the forbidden network list of the terminal.

20 Claims, 5 Drawing Sheets

12

Network side device

11

11

Terminal

Terminal

(58) Field of Classification Search

USPC .......................................................... 370/329

See application file for complete search history.

(56) References Cited

U.S. PATENT DOCUMENTS

| | | | |
|---|---|---|---|
| 2012/0100848 A1 | 4/2012 | Miklos | |
| 2013/0286950 A1* | 10/2013 | Pu | H04L 12/56 |
| | | | 370/328 |
| 2014/0293775 A1* | 10/2014 | Zhang | H04L 12/437 |
| | | | 370/228 |
| 2015/0295696 A1* | 10/2015 | Jin | H04L 5/14 |
| | | | 370/277 |
| 2018/0014178 A1* | 1/2018 | Baek | H04W 8/20 |
| 2019/0215881 A1* | 7/2019 | Hou | H04W 48/18 |
| 2022/0015016 A1* | 1/2022 | Sood | H04W 48/14 |
| 2022/0070814 A1 | 3/2022 | Chun | |
| 2022/0070815 A1 | 3/2022 | Chun | |
| 2022/0330056 A1* | 10/2022 | Peng | H04W 76/19 |
| 2022/0360985 A1* | 11/2022 | Lin | H04W 48/18 |
| 2023/0080067 A1* | 3/2023 | Zhu | H04W 12/06 |
| | | | 455/435.2 |
| 2023/0254677 A1* | 8/2023 | Park | H04W 4/90 |
| | | | 455/404.1 |
| 2023/0269689 A1* | 8/2023 | Park | H04W 24/04 |
| | | | 455/432.1 |
| 2024/0007878 A1* | 1/2024 | Starsinic | H04W 4/06 |
| 2024/0129845 A1* | 4/2024 | Velev | H04W 76/50 |

FOREIGN PATENT DOCUMENTS

| | | |
|---|---|---|
| WO | 2020102831 A1 | 5/2020 |
| WO | 2020/141964 A1 | 7/2020 |
| WO | 2020141965 A1 | 7/2020 |

OTHER PUBLICATIONS

"On PLMN selection for MINT", 3GPP TSG-SA WG1 Meeting #88, S1-193281, Reno, USA, Nov. 18-22, 2019, 7 pages.

Ericsson, "MINT: alternative 1 for How do other PLMNs indicate that they can accept "Disaster Inbound Roamers"?", 3GPP TSG-CT WG1 Meeting #126-e, Electronic meeting, Oct. 15-23, 2020, C1-207326.

LG Electronics, "Key Issues for FS_MINT-CT", 3GPP TSG CT WG1 Meeting #127-e, Electronic meeting, Nov. 13-20, 2020, C1-207310.

Qualcomm Incorporated, "Key Issues for MINT", 3GPP TSG CT WG1 Meeting #126-e, Electronic meeting, Oct. 15-23, 2020, C1-205944.

* cited by examiner

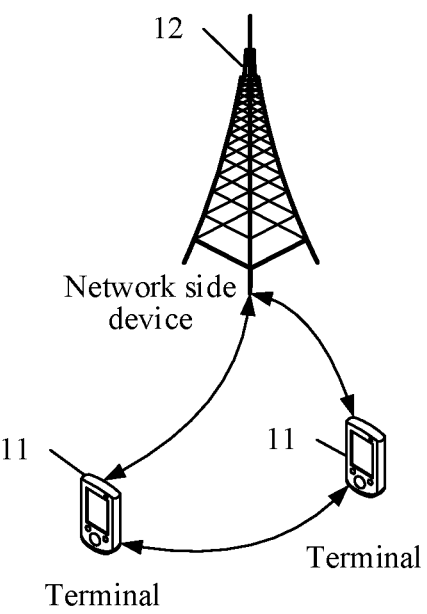

Network side
device

Terminal

Terminal

FIG. 1

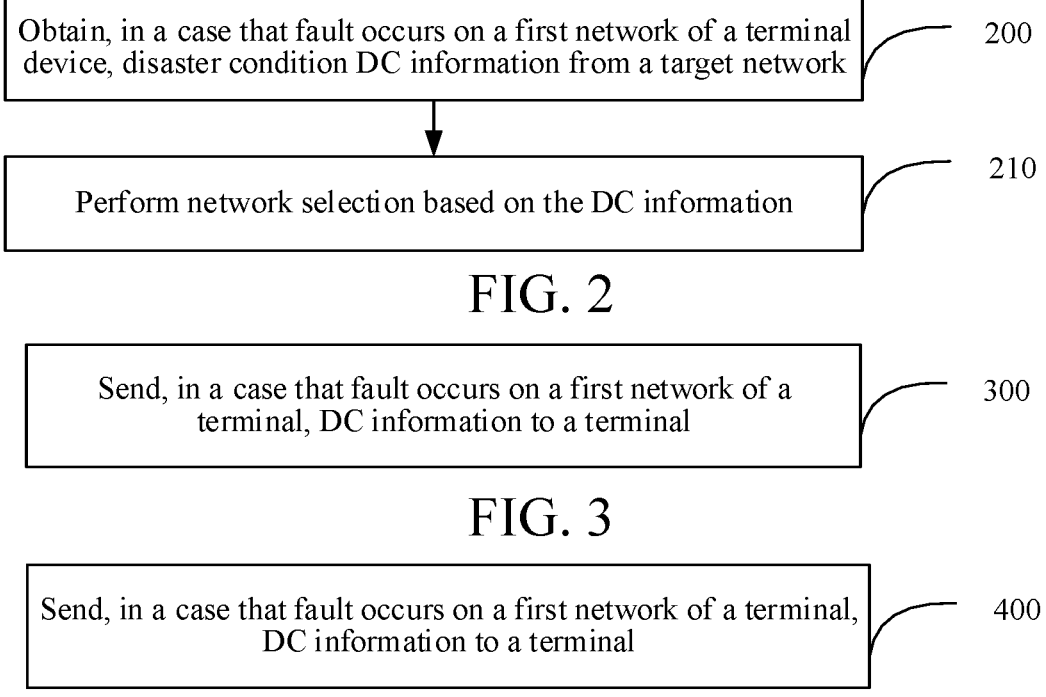

| Obtain, in a case that fault occurs on a first network of a terminal device, disaster condition DC information from a target network | 200 |

| Perform network selection based on the DC information | 210 |

FIG. 2

| Send, in a case that fault occurs on a first network of a terminal, DC information to a terminal | 300 |

FIG. 3

| Send, in a case that fault occurs on a first network of a terminal, DC information to a terminal | 400 |

FIG. 4

Figures 7, 8, 9, 10, 11:
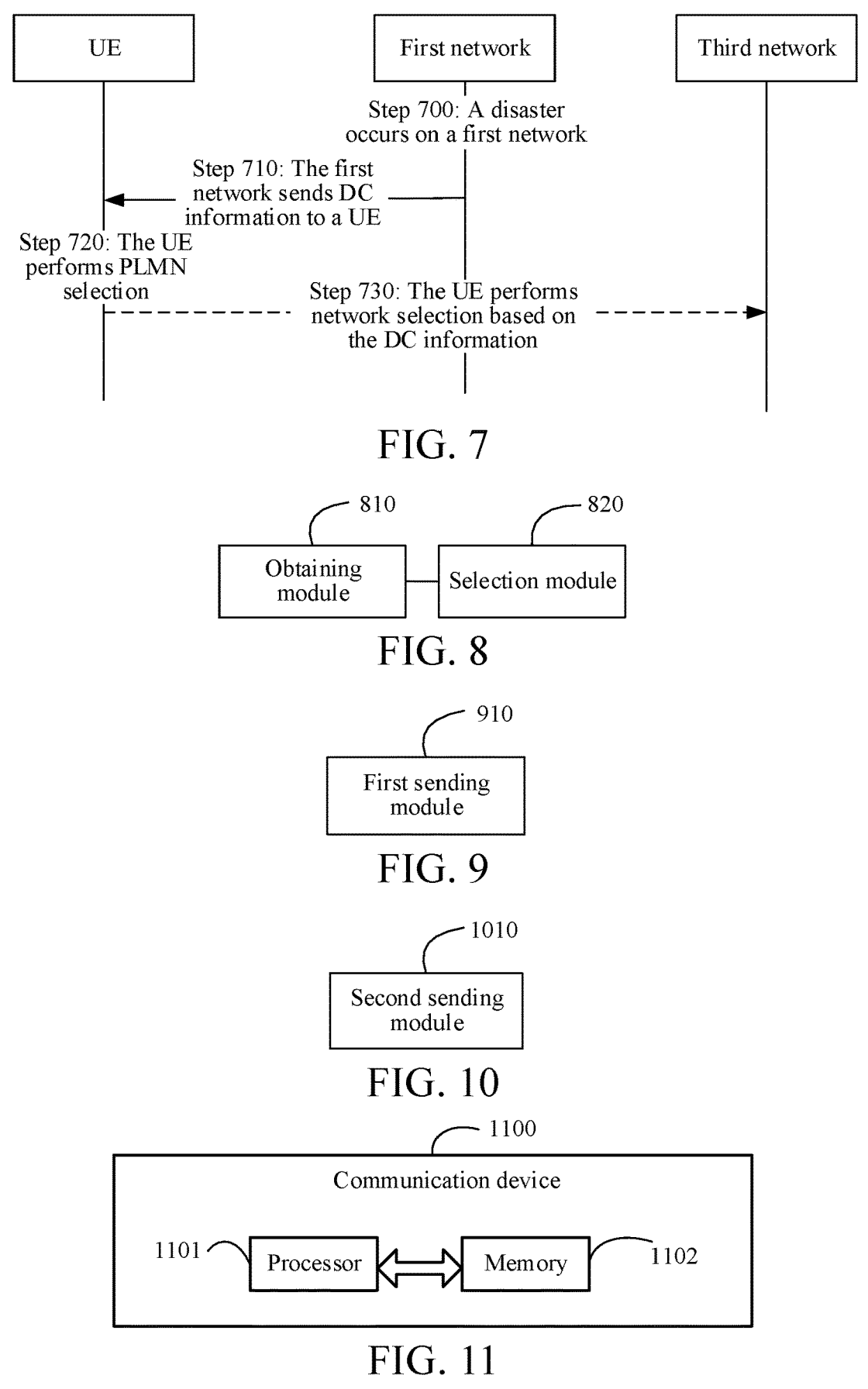

| UE | First network | Third network |
|----|---------------|---------------|

Step 700: A disaster
occurs on a first network

Step 710: The first
network sends DC
information to a UE

Step 720: The UE
performs PLMN
selection

Step 730: The UE performs
network selection based on
the DC information

Obtaining
module

820

Selection module

First sending
module

Second sending
module

Communication device

1101

Processor

Memory

NETWORK SELECTION METHOD AND APPARATUS, DEVICE, AND STORAGE MEDIUM

CROSS-REFERENCE TO RELATED APPLICATIONS

This application is a continuation of International Application No. PCT/CN2021/142061, filed on Dec. 28, 2021, which claims priority to Chinese Patent Application No. 202011593449.5 filed in China on Dec. 29, 2020, which is incorporated herein by reference in its entirety.

TECHNICAL FIELD

This application relates to the field of communication technologies, and in particular, relates to a network selection method and an apparatus, a device, and a storage medium.

BACKGROUND

When a first network is unavailable due to a device fault, a disaster, or another reason, a terminal may receive disaster condition (DC) information indicating that, when fault occurs on the first network, a second network supports providing a service to the terminal, so that network selection can be performed based on the DC information.

The DC information may be delivered by a master information block (MIB) or a SIB1 broadcast in a system information block (SIB), but mostly delivered by another SIB. However, because a network does not actively deliver other SIB information, the terminal cannot receive other SIB information of the second network to obtain the DC information, but enters a limited service state, and performs emergency registration.

SUMMARY

According to a first aspect of the present disclosure, a network selection method is provided and applied to a terminal, the method includes:

obtaining, in a case that fault occurs on a first network of the terminal, disaster condition DC information from a target network; and performing network selection based on the DC information, where the target network includes: the first network and/or a second network, where the first network is a network that does not exist in a forbidden network list of the terminal; and the second network is a network that exists in the forbidden network list of the terminal.

According to a second of the present disclosure aspect, a network selection method is provided and applied to a first network, the method includes:

sending, in a case that fault occurs on the first network of a terminal, DC information to the terminal, where the DC information is used by the terminal to perform network selection in a case that fault occurs on the first network; and the first network is a network that does not exist in a forbidden network list of the terminal.

According to a third aspect of the present disclosure, a network selection method is provided and applied to a second network, the method includes:

sending, in a case that fault occurs on a first network of a terminal, DC information to the terminal, where the DC information is used by the terminal to perform network selection in a case that fault occurs on the first network; and the second network is a network that exists in a forbidden network list of the terminal.

According to a fourth aspect of the present disclosure, a network selection apparatus is provided and applied to a terminal, the apparatus includes:

an obtaining module, configured to obtain, in a case that fault occurs on a first network of the terminal, disaster condition DC information from a target network; and a selection module, configured to perform network selection based on the DC information, where the target network includes: the first network and/or a second network, where the first network is a network that does not exist in a forbidden network list of the terminal; and the second network is a network that exists in the forbidden network list of the terminal.

According to a fifth aspect of the present disclosure, a network selection apparatus is provided and applied to a first network, the apparatus includes:

a first sending module, configured to send, in a case that fault occurs on the first network of a terminal, DC information to the terminal, where the DC information is used by the terminal to perform network selection in a case that fault occurs on the first network; and the first network is a network that does not exist in a forbidden network list of the terminal.

According to a sixth aspect of the present disclosure, a network selection apparatus is provided and applied to a second network, the apparatus includes:

a second sending module, configured to send, in a case that fault occurs on a first network of a terminal, DC information to the terminal, where the DC information is used by the terminal to perform network selection in a case that fault occurs on the first network; and the second network is a network that exists in a forbidden network list of the terminal.

According to a seventh aspect of the present disclosure, a terminal is provided, including a processor, a memory, and a program or an instruction stored in the memory and capable of being run on the processor, and the program or the instruction, when executed by the processor, implements the steps of the network selection method according to the first aspect.

According to an eighth aspect of the present disclosure, a first network device is provided, including a processor, a memory, and a program or an instruction stored in the memory and capable of being run on the processor, and the program or the instruction, when executed by the processor, implements the steps of the network selection method according to the second aspect.

According to a ninth aspect of the present disclosure, a second network device is provided, including a processor, a memory, and a program or an instruction stored in the memory and capable of being run on the processor, and the program or the instruction, when executed by the processor, implements the steps of the network selection method according to the third aspect.

According to a tenth aspect of the present disclosure, a readable storage medium is provided, where the readable storage medium stores a program or an instruction, and the program or the instruction, when executed by a processor, implements the steps of the network selection method according to the first aspect, or implements the steps of the network selection method according to the second aspect, or implements the steps of the network selection method according to the third aspect.

According to an eleventh aspect of the present disclosure, a chip is provided, where the chip includes a processor and a communication interface, the communication interface is coupled to the processor, and the processor is configured to run a program or an instruction, to implement the steps of the network selection method according to the first aspect, or implement the steps of the network selection method according to the second aspect, or implement the steps of the network selection method according to the third aspect.

According to a twelfth aspect of the present disclosure, a computer program product is provided, where the computer program product is stored in a non-transitory storage medium, and the computer program product is executed by at least one processor to implement the steps of the network selection method according to the first aspect, or implement the steps of the network selection method according to the second aspect, or implement the steps of the network selection method according to the third aspect.

According to a thirteenth aspect of the present disclosure, a communication device is provided, configured to implement the steps of the network selection method according to the first aspect, or configured to implement the steps of the network selection method according to the second aspect, or configured to implement the steps of the network selection method according to the third aspect.

BRIEF DESCRIPTION OF THE DRAWINGS

FIG. 1 is a block diagram of a wireless communication system according to an embodiment of this application;

FIG. 2 is a schematic flowchart 1 of a network selection method according to an embodiment of this application;

FIG. 3 is a schematic flowchart 2 of a network selection method according to an embodiment of this application;

FIG. 4 is a schematic flowchart 3 of a network selection method according to an embodiment of this application;

FIG. 7 is a schematic flowchart 6 of a network selection method according to an embodiment of this application;

FIG. 8 is a schematic structural diagram 1 of a network selection apparatus according to an embodiment of this application;

FIG. 9 is a schematic structural diagram 2 of a network selection apparatus according to an embodiment of this application;

FIG. 10 is a schematic structural diagram 3 of a network selection apparatus according to an embodiment of this application;

FIG. 11 is a schematic structural diagram of a communication device according to an embodiment of this application;

DETAILED DESCRIPTION

Figures 5, 6:
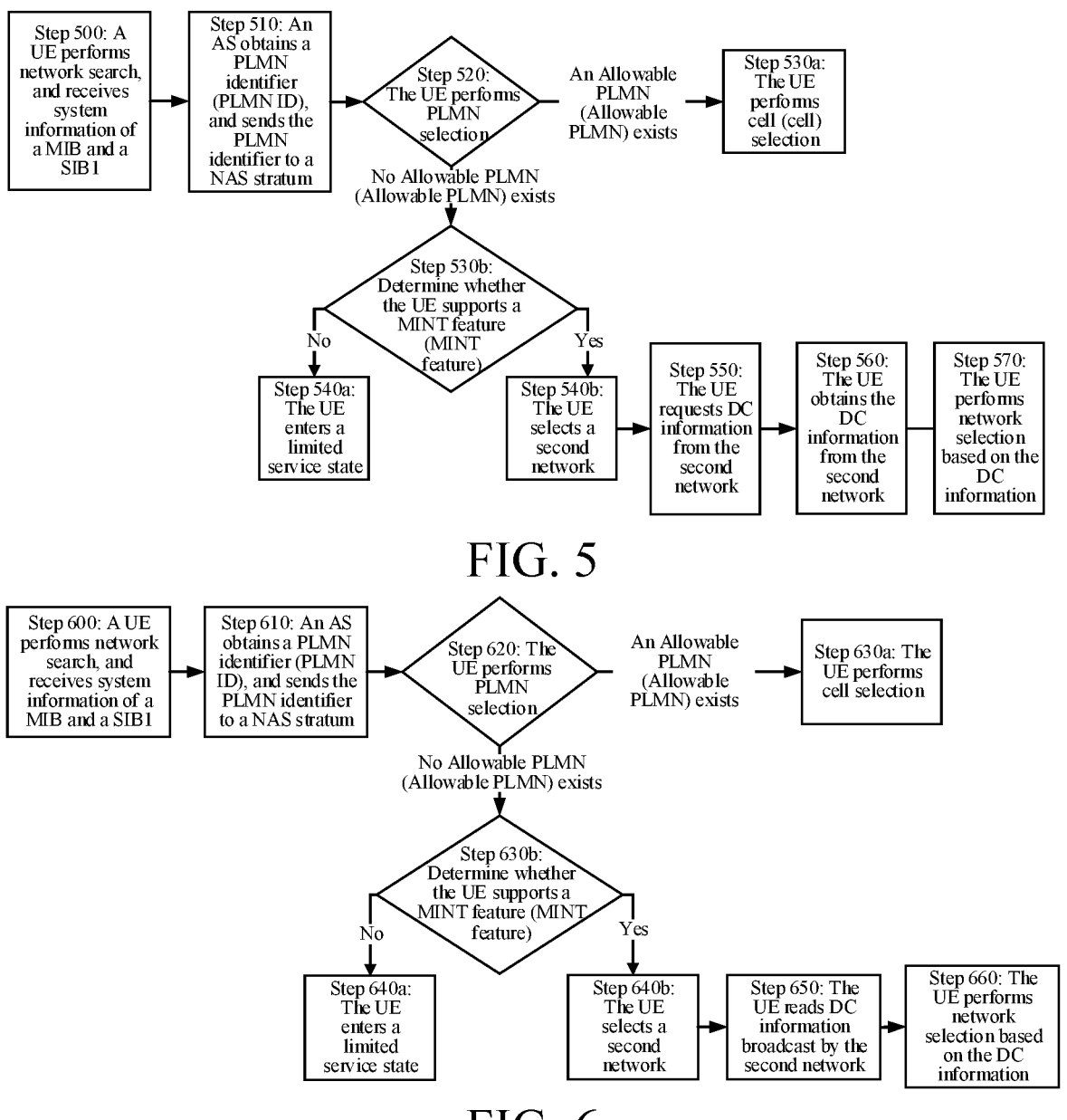
FIG. 5 is a schematic flowchart 4 of a network selection method according to an embodiment of this application.
FIG. 6 is a schematic flowchart 5 of a network selection method according to an embodiment of this application.

The following clearly describes the technical solutions in embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the specification and claims of this application, the terms "first", "second", and so on are intended to distinguish between similar objects but do not indicate a particular order or sequence. It should be understood that the data so used may be interchanged in an appropriate condition, so that the embodiments of this application can be implemented in a sequence other than those illustrated or described herein. In addition, objects distinguished by "first" and "second" are usually a same type, and a quantity of the objects is not limited, for example, a first object may be one or may be a plurality. In addition, "and/or" in this specification and the claims indicates at least one of the connected objects. A character "/" usually indicates an "or" relationship between the associated objects.

It should be noted that, the technologies described in the embodiments of this application are not limited to a long term evolution (LTE)/LTE-advanced (LTE-A) system, and may be further applied to other wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. In the embodiments of this application, the terms "system" and "network" may usually be used interchangeably. The described technology can be applied to the systems and radio technologies mentioned above, and can also be applied to other systems and radio technologies. However, the following description describes a new radio (NR) system for an exemplary objective, and uses NR terms in most of the following description, although such technologies may also be applied to applications except an NR system application, such as a 6th generation (6G) communication system.

FIG. 1 is a block diagram of a wireless communication system according to an embodiment of this application. The wireless communication system includes a terminal 11 and a network side device 12. The terminal 11 may also be referred to as a terminal device or a user equipment (UE). The terminal 11 may be a mobile phone, a tablet personal computer, a laptop computer referred to as a notebook computer, a personal digital assistant (PDA), a palm personal computer, a netbook, an ultra-mobile personal computer (UMPC), a mobile Internet device (MID), a wearable device or a vehicle user equipment (VUE), a pedestrian user equipment (PUE), or other terminal side devices. The wearable device includes: a smart watch, an earphone, glasses, and the like. It should be noted that, a specific type of the terminal 11 is not limited the embodiments of this application. The network side device 12 may be a base station or a core network, where the base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmitting receiving point (TRP), or another suitable term in the field. As long as the same technical effects can be achieved, the base station is not limited by a specific technical term. It should be noted that, a base station in the NR system is merely used as an example in the embodiments of this application, but a specific type of the base station is not limited.

The following describes a network selection method and apparatus provided in the embodiments of this application in detail with reference to the accompanying drawings by using specific embodiments and application scenarios thereof.

FIG. 2 is a schematic flowchart 1 of a network selection method according to an embodiment of this application. The method is applied to a terminal. As shown in FIG. 2, the method includes the following steps:

Step 200: Obtain, in a case that fault occurs on a first network of the terminal, disaster condition DC information from a target network.

Step 210: Perform network selection based on the DC information.

The target network includes: the first network and/or a second network, where the first network is a network that does not exist in a forbidden network list of the terminal; and the second network is a network that exists in the forbidden network list of the terminal.

Optionally, in a case that a UE operates in a UE operation mode A or B, an allowable public land mobile network (PLMN) is not in a "forbidden PLMN" list in a subscriber identity module (SIM)/universal subscriber identity module (USIM), where the list can be expanded in a memory of a mobile equipment (ME). In a case that the UE operates in a UE operation mode C, the allowable PLMN is not in the "forbidden PLMN" list in the SIM/USIM, or not in a "forbidden PLMN used in general packet radio service (GPRS)" list in the ME. When there is no available PLMN in the "forbidden PLMN" list in the SIM/SUIM in addition to a PLMN, and the available PLMN indicates to be applicable to the disaster condition, the PLMN can be considered as being allowed to register for the UE and be applicable to the disaster condition. Therefore, in a case that fault occurs on a home network, that is, the first network, the UE can select another network to provide a service such as an emergency service, a data service, a voice service, and a video service, to the UE.

Optionally, that fault occurs on the first network may refer to that fault or a disaster occurs on a related device of the first network, for example, fault occurs on a core network device, and a service cannot be provided to the UE.

Optionally, a disaster condition, a disaster, and the like of the first network may all refer to a case that fault occurs on the first network.

Optionally, the first network is a network not in a "Forbidden PLMN" list (list) of the UE, may be a home network of the UE, and may further provide the DC information to the UE.

Optionally, the second network is an available (available) network that exists in the "Forbidden PLMN" list of the UE, and may be configured to provide the DC information to the UE.

Optionally, the second network may be a network that exists in the forbidden network list of the terminal, and the terminal is in a coverage range of the second network, to ensure that the terminal can receive information sent by the second network. Optionally, the disaster condition (DC) information may include information such as an indication used for notifying the UE that a disaster occurs on the first network, and/or, an indication that the second network or another network can provide a service to the UE of the first network under a disaster condition.

Optionally, if a mobile station (MS) cannot find a cell suitable to reside, or has no SIM inserted, or if the MS operates in a stand-alone non-public network (SNPN) access mode, or receives a specified message, there is no valid entry in a "user data list" to respond to a location registration (LR) request (for example, an "invalid MS"). Regardless of an identity of the PLMN or an identity of the SNPN, the MS attempts to reside on a cell, and enters a "limited service" state. Under this state, the MS can only attempt to make an emergency call or access restricted local operator services (RLOS). An MS operating in an NB-S1 mode never attempts to make the emergency call or access the restricted local operator services (RLOS). An MS operating in the stand-alone non-public network (SNPN) access mode never attempts to make the emergency call. An MS operating in an N1 mode never attempts to access the RLOS.

Optionally, when the first network of the UE is available due to a device fault, a disaster, or another reason, the UE can receive the DC information used for indicating that, when fault occurs on the first network, the second network or another network supports providing a service to the UE whose home network is the first network. The DC information may be broadcast by a MIB or a SIB1, or may be delivered by another SIB. Because minimization of service interruption (MINT) is an extreme case, to save resources, the DC information is more likely to be delivered by another SIB. If the DC information is not delivered by the MIB or the SIB1, but is delivered by another SIB, because a network does not actively deliver other SIB information, the UE does not read other SIB information of the second network to obtain the DC information, so that a network selection process under a disaster condition cannot be triggered, and the UE enters a limited service state, and performs emergency registration.

Optionally, to resolve a problem how to trigger the UE to obtain the DC information, in a case that fault occurs on the first network of the terminal, the terminal may obtain the disaster condition DC information from the target network, to ensure that the terminal can obtain the DC information, and then can perform the network selection process based on the DC information.

Optionally, when there is no allowable PLMN, if the UE supports a MINT feature, the DC information can be obtained.

Optionally, the UE may obtain the DC information from the first network, for example, when a disaster occurs on the first network, the first network may deliver the DC information to the UE.

Optionally, the UE may obtain the DC information from the first network, for example, when a disaster occurs on the first network, the first network may broadcast the DC information.

Optionally, the UE may obtain the DC information from the second network, for example, when a disaster occurs on the first network, the second network may broadcast the DC information.

Optionally, after obtaining the DC information, the UE can perform network access control, that is, the network selection, based on the DC information.

Optionally, the first network may be, but not limited to, a PLMN in new radio (NR) or long term evolution (LTE), and may be referred to as a first PLMN.

Optionally, the second network may be, but not limited to, a PLMN in NR or LTE, and may be referred to as a second PLMN.

In the embodiments of this application, in a case that fault occurs on the first network of the terminal, the terminal may obtain the DC information from the first network or the second network in a communication connection in the forbidden network list, to ensure that the terminal can obtain the DC information and perform network selection, thereby improving a success rate of network access.

Optionally, the obtaining, in a case that fault occurs on a first network of the terminal, DC information from a target network includes:

obtaining, in a case that networks corresponding to network identifiers obtained from a non-access stratum NAS are all in the forbidden network list of the terminal, and the terminal supports a minimization of service interruption MINT feature, the DC information from the target network.

Optionally, after the UE performs network search and obtains system information of the MIB and the SIB1, the AS can read a PLMN identifier (PLMN ID) from the SIB1, and send the PLMN identifier to a non-access stratum (Non-Access Stratum, NAS), if the NAS determines there are Allowable PLMN(s), an Allowable PLMN is selected from the Allowable PLMN(s) to perform a process such as cell (cell) selection, and if PLMN ID(s) received by the NAS are all in the "forbidden PLMN" list (forbidden list), whether the UE supports the MINT feature can be further determined.

Optionally, if the UE does not support the MINT feature, the UE enters the limited service state.

Optionally, if the UE supports the MINT feature, a PLMN may be selected from the PLMN ID(s) in the forbidden list to serve as the second network for obtaining the DC information.

Optionally, in a case that the target network is the first network, the obtaining DC information from a target network includes:

receiving the DC information sent by the first network after fault.

Optionally, the UE may obtain the DC information from the first network, for example, when a disaster occurs on the first network, the first network may deliver the DC information to the UE.

Optionally, in a case that a disaster occurs on the first network, for example, fault occurs on a core network device, a base station side may still deliver or broadcast the system information, so that the DC information may be delivered to the UE.

Optionally, the DC information may be: a PLMN list (PLMN list), that is, a network list of third networks that can provide a data service to the first network under a disaster condition, and/or, an indication that a disaster occurs on the first network.

Optionally, the DC information is sent through at least one of the following messages: a NAS message; and an AS message.

Optionally, when the first network sends the DC information to the UE, the sending may be performed through at least one of, but not limited to, the following messages: a NAS message, an AS message, and the like.

Optionally, in a case that the target network is the first network and/or the second network, the obtaining DC information from a target network includes:

receiving the DC information broadcast by the first network and/or the second network.

Optionally, the UE may obtain the DC information from the first network, for example, when a disaster occurs on the first network, the first network may broadcast the DC information.

Optionally, the UE may obtain the DC information from the second network, for example, when a disaster occurs on the first network, the second network may broadcast the DC information.

Optionally, the UE may obtain the DC information from the first network or the second network, for example, when a disaster occurs on the first network, both the first network and the second network may broadcast the DC information. The UE may receive the DC information broadcast by one of the first network and the second network, or receive the DC information broadcast by the two networks and select one for use, for example, one may be arbitrarily selected for use, or previously received DC information may be selected for use.

Optionally, if the UE supports the MINT feature, a PLMN may be selected from the PLMN ID(s) in the forbidden list to serve as the second network.

Optionally, PLMNs that can serve as the second network may all broadcast the DC information, to ensure that the UE can select a network currently broadcasting the DC information as the second network.

Optionally, in a case that a disaster occurs on the first network, for example, fault occurs on the core network, the base station side may still deliver or broadcast the system information, so that the DC information can be broadcast, and the UE can receive the DC information broadcast by the first network.

Optionally, the DC information is sent through at least one of the following messages: a MIB; a SIB1; and other SIB information.

Optionally, the DC information may be broadcast through at least one of, but not limited to, the following messages: the MIB, the SIB1, or other SIB information.

Optionally, in a case that the target network is the second network, the obtaining DC information from a target network includes:

sending request information to the second network, where the request information is used for requesting the DC information.

Optionally, the UE may request the DC information from the second network.

Optionally, the DC information may include information such as whether the second network supports providing a data service for the UE of a disastrous PLMN, and/or, a PLMN list that supports providing a service to the UE of the disastrous PLMN and that is provided by the second network.

Optionally, the second network may return the DC information after receiving the request from the UE.

Optionally, the UE may perform access control based on the forbidden PLMN in the DC information returned by the second network.

Optionally, the UE may determine, based on the information returned by the second network, whether the second network can be accessed to obtain a service, for example, when the DC information includes indication information that the second network can provide a data service to the UE of the disastrous PLMN, the second network can be accessed to obtain a service.

Optionally, the UE may determine, based on the information returned by the second network, that is, the DC information, a third network that can be accessed to obtain a service, and complete the network selection process.

Optionally, the request information is sent through at least one of the following messages: a NAS message; and an AS message.

Optionally, when the UE requests the DC information from the second network, the request may be performed through a NAS message or an AS message.

Optionally, the DC information includes:

a list of third networks, where the third networks are networks that support providing a first service to the terminal.

Optionally, the DC information may include the list of the third networks that support providing a first service to the terminal.

Optionally, the list of the third networks may include all or some third networks that support providing the first service to the terminal.

Optionally, the list of the third networks may include third networks that support providing the first service to the terminal and that are provided by the first network and/or the second network.

Optionally, the third network may be, but not limited to, a PLMN in NR or LTE, and may be referred to as a third PLMN.

Optionally, in a case that the target network is the second network, the DC information further includes:

first information used for indicating whether the second network supports providing the first service to the terminal.

Optionally, when the target network is the second network, the DC information may further include the first information used for indicating whether the second network supports providing the first service to the terminal, to notify the UE whether a service can be obtained from the second network.

Optionally, the first service includes any one or a combination of the following:

an emergency service;

a data service;

a voice service; and a video service.

Optionally, the first service may include, but is not limited to, any one or a combination of the following: an emergency service; a data service; a voice service; and a video service, to ensure normal service processing of the UE In the embodiments of this application, in a case that fault occurs on the first network of the terminal, the terminal may obtain the DC information from the first network or the second network in a communication connection in the forbidden network list, to ensure that the terminal can obtain the DC information and perform network selection, thereby improving a success rate of network access.

FIG. 3 is a schematic flowchart 2 of a network selection method according to an embodiment of this application. The method is applied to a first network. As shown in FIG. 3, the method includes the following steps:

Step 300: Send, in a case that fault occurs on the first network of a terminal, DC information to the terminal.

The DC information is used by the terminal to perform network selection in a case that fault occurs on the first network; and the first network is a network that does not exist in a forbidden network list of the terminal.

Optionally, the first network is a network not in a "forbidden PLMN" list of a UE, may be a home network of the UE, or may be a public land mobile (communication) network (PLMN) that provides the DC information to the UE.

Optionally, the disaster condition (DC) information may include information such as an indication used for notifying the UE that a disaster occurs on the first network, and/or, an indication that the second network or another network can provide a service to the UE of the first network under a disaster condition.

Optionally, the second network is an available (available) network that exists in the "Forbidden PLMN" list of the UE, and may be configured to provide the DC information to the UE.

Optionally, when the first network of the UE is available due to a device fault, a disaster, or another reason, the UE can receive the DC information used for indicating that, when fault occurs on the first network, the second network or another network supports providing a service to the UE whose home network is the first network. The DC information may be broadcast by a MIB or a SIB1, or may be delivered by another SIB. Because minimization of service interruption (MINT) is an extreme case, to save resources, the DC information is more likely to be delivered by another SIB. If the DC information is not delivered by the MIB or the SIB1, but is delivered by another SIB, because a network does not actively deliver other SIB information, the UE does not read other SIB information of the second network to obtain the DC information, so that a network selection process under a disaster condition cannot be triggered, and the UE enters a limited service state, and performs emergency registration.

Optionally, to resolve a problem how to trigger the UE to obtain the DC information, in a case that fault occurs on the first network of the terminal, the first network may send the disaster condition DC information to the terminal, to ensure that the terminal can obtain the DC information, and perform the network selection process based on the DC information.

Optionally, when there is no Allowable PLMN, if the UE supports a MINT feature, the DC information can be obtained.

Optionally, the first network may send the disaster condition DC information to the terminal, for example, when a disaster occurs on the first network, the first network may deliver the DC information to the UE.

Optionally, the first network may send the disaster condition DC information to the terminal, for example, when a disaster occurs on the first network, the first network may broadcast the DC information.

Optionally, after obtaining the DC information, the UE can perform network access control, that is, the network selection, based on the DC information.

Optionally, the first network may be, but not limited to, a PLMN in NR or LTE, and may be referred to as a first PLMN.

Optionally, the second network may be, but not limited to, a PLMN in NR or LTE, and may be referred to as a second PLMN.

In the embodiments of this application, in a case that fault occurs on the first network of the terminal, the first network may actively send the DC information to the terminal, to ensure that the terminal can obtain the DC information and perform network selection, thereby improving a success rate of network access.

Optionally, the sending DC information to the terminal includes:

broadcasting the DC information to the terminal.

Optionally, the first network may send the disaster condition DC information to the terminal, for example, when a disaster occurs on the first network, the first network may broadcast the DC information.

Optionally, if the UE supports the MINT feature, a PLMN may be selected from the PLMN ID(s) in the forbidden list to serve as the second network.

Optionally, in a case that a disaster occurs on the first network, for example, fault occurs on the core network, the base station side may still deliver or broadcast the system information, so that the DC information can be broadcast, and the UE can receive the DC information broadcast by the first network.

Optionally, the DC information is sent through at least one of the following messages: a NAS message; and an AS message.

Optionally, the DC information may be broadcast through at least one of, but not limited to, the following messages: the MIB, the SIB1, or other SIB information.

Optionally, the DC information includes:

a list of third networks, where the third networks are networks that support providing a first service to the terminal.

Optionally, the DC information may include the list of the third networks that support providing a first service to the terminal.

Optionally, the list of the third networks may include all or some third networks that support providing the first service to the terminal.

Optionally, the list of the third networks may include third networks that support providing the first service to the terminal and that are provided by the first network and/or the second network.

Optionally, the third network may be, but not limited to, a PLMN in new radio (NR) or long term evolution (LTE), and may be referred to as a third PLMN.

Optionally, the first service includes any one or a combination of the following:

an emergency service;

a data service;

a voice service; and a video service.

Optionally, the first service may include, but is not limited to, any one or a combination of the following: an emergency service; a data service; a voice service; and a video service, to ensure normal service processing of the UE.

In the embodiments of this application, in a case that fault occurs on the first network of the terminal, the first network may actively send the DC information to the terminal, to ensure that the terminal can obtain the DC information and perform network selection, thereby improving a success rate of network access.

FIG. 4 is a schematic flowchart 3 of a network selection method according to an embodiment of this application. The method is applied to a second network. As shown in FIG. 4, the method includes the following steps:

Step 400: Send, in a case that fault occurs on a first network of a terminal, DC information to the terminal.

The DC information is used by the terminal to perform network selection in a case that fault occurs on the first network; and the second network is a network that exists in a forbidden network list of the terminal.

Optionally, the first network is a network not in a "Forbidden PLMN" list of a UE, may be a home network of the UE, or may be a public land mobile (communication) network (PLMN) that provides the DC information to the UE.

The second network is an available network that exists in the "Forbidden PLMN" list of the UE, and may be configured to provide the DC information to the UE.

Optionally, the disaster condition (Disaster Condition, DC) information may include information such as an indication used for notifying the UE that a disaster occurs on the first network, and/or, an indication that the second network or another network can provide a service to the UE of the first network under a disaster condition.

Optionally, when the first network of the UE is available due to a device fault, a disaster, or another reason, the UE can receive the DC information used for indicating that, when fault occurs on the first network, the second network or another network supports providing a service to the UE whose home network is the first network. The DC information may be broadcast by a MIB or a SIB1, or may be delivered by another SIB. Because minimization of service interruption (Minimization of service Interruption, MINT) is an extreme case, to save resources, the DC information is more likely to be delivered by another SIB. If the DC information is not delivered by the MIB or the SIB1, but is delivered by another SIB, because a network does not actively deliver other SIB information, the UE does not read other SIB information of the second network to obtain the DC information, so that a network selection process under a disaster condition cannot be triggered, and the UE enters a limited service state, and performs emergency registration.

Optionally, to resolve a problem how to trigger the UE to obtain the DC information, in a case that fault occurs on the first network of the terminal, the second network sends the disaster condition DC information to the terminal, to ensure that the terminal can obtain the DC information, and then can perform the network selection process based on the DC information.

Optionally, when there is no Allowable PLMN, if the UE supports a MINT feature, the DC information can be obtained.

Optionally, the second network may send the disaster condition DC information to the terminal, for example, when a disaster occurs on the first network, the second network may broadcast the DC information.

Optionally, after obtaining the DC information, the UE can perform network access control, that is, the network selection, based on the DC information.

Optionally, the first network may be, but not limited to, a PLMN in NR or LTE, and may be referred to as a first PLMN.

Optionally, the second network may be, but not limited to, a PLMN in NR or LTE, and may be referred to as a second PLMN.

In this embodiments of this application, in a case that fault occurs on the first network of the terminal, the second network in a communication connection in the forbidden network list of the terminal may send the DC information to the terminal, to ensure that the terminal can obtain the DC information and perform network selection, thereby improving a success rate of network access.

Optionally, the sending DC information to the terminal includes:

broadcasting the DC information to the terminal.

Optionally, the second network may send the disaster condition DC information to the terminal, for example, when a disaster occurs on the first network, the second network may broadcast the DC information.

Optionally, if the UE supports the MINT feature, a PLMN may be selected from the PLMN ID(s) in the forbidden list to serve as the second network.

Optionally, PLMNs that can serve as the second network may all broadcast the DC information, to ensure that the UE can select a network currently broadcasting the DC information as the second network.

Optionally, the DC information is sent through at least one of the following messages: a MIB; a SIB1; and other SIB information.

Optionally, the DC information may be broadcast through at least one of, but not limited to, the following messages: the MIB, the SIB1, or other SIB information.

Optionally, the sending DC information to the terminal includes:

receiving request information sent by the terminal; and sending the DC information to the terminal based on the request information.

Optionally, the UE may request the DC information from the second network.

Optionally, the DC information may include information such as whether the second network supports providing a data service for the UE of a disastrous PLMN, and/or, a PLMN list that supports providing a service to the UE of the disastrous PLMN and that is provided by the second network.

Optionally, the second network may return the DC information after receiving the request from the UE.

Optionally, the UE may perform access control based on the forbidden PLMN in the DC information returned by the second network.

Optionally, the request information is sent through at least one of the following messages: a NAS message; and an AS message.

Optionally, when the UE requests the DC information from the second network, the request may be performed through a NAS message or an AS message.

Optionally, the DC information includes:

a list of third networks, where the third networks are networks that support providing a first service to the terminal.

Optionally, the DC information may include the list of the third networks that support providing a first service to the terminal.

Optionally, the list of the third networks may include all or some third networks that support providing the first service to the terminal.

Optionally, the list of the third networks may include third networks that support providing the first service to the terminal and that are provided by the first network and/or the second network.

Optionally, the third network may be, but not limited to, a PLMN in NR or LTE, and may be referred to as a third PLMN.

Optionally, the DC information further includes:

first information used for indicating whether the second network supports providing the first service to the terminal.

Optionally, when the target network is the second network, the DC information may further include the first information used for indicating whether the second network supports providing the first service to the terminal, to notify the UE whether the UE can directly access the second network.

Optionally, the first service includes any one or a combination of the following:

an emergency service;

a data service;

a voice service; and a video service.

Optionally, the first service may include, but is not limited to, any one or a combination of the following: an emergency service; a data service; a voice service; and a video service, to ensure normal service processing of the UE.

In this embodiments of this application, in a case that fault occurs on the first network of the terminal, the second network in a communication connection in the forbidden network list of the terminal may send the DC information to the terminal, to ensure that the terminal can obtain the DC information and perform network selection, thereby improving a success rate of network access.

FIG. 5 is a schematic flowchart 4 of a network selection method according to an embodiment of this application. As shown in FIG. 5, the method includes the following steps:

Step 500: A UE performs network search, and receives system information of a MIB and a SIB1.

Step 510: An access stratum (AS) reads a PLMN ID from the SIB1, and sends the PLMN ID to a NAS stratum.

Optionally, the AS obtains related information such as the PLMN ID and measurement information, and obtains the PLMN ID in the information and sends the PLMN ID to the NAS stratum.

Step 520: The UE performs PLMN selection.

Optionally, the NAS may performs PLMN selection based on received PLMN ID(s) and stored PLMN list information, such as a forbidden list.

Step 530*a*: If it is determined that there are Allowable PLMN(s), one Allowable PLMN may be selected from the Allowable PLMN(s) to perform processes such as cell selection.

Step 530*b*: If the PLMN ID(s) received by the NAS are all in the forbidden list, even if there is no Allowable PLMN, whether the UE supports a MINT feature can be determined.

Step 540*a*: If the UE does not support the MINT feature, the UE enters the limited Step 540*b*: The UE selects a second network.

Optionally, if the UE supports the MINT feature, a PLMN may be selected from the PLMN ID(s) in the forbidden list to serve as the second network.

Step 550: The UE requests DC information from the second network.

Optionally, the request may be performed through a NAS message or an AS message.

Optionally, the DC information may include information such as whether the second network provides a data service to the UE of a disastrous PLMN, and/or, the PLMN list that supports providing a service to the UE of the disastrous PLMN.

Step 560: The UE obtains the DC information from the second network.

Optionally, the second network may return the DC information based on the request of the UE.

Step 570: The UE performs network selection based on the DC information.

Optionally, the UE may determine, based on the DC information returned by the second network, whether the second network can be accessed to obtain a service, for example, when the DC information includes indication information that the second network can provide a data service to the UE of the disastrous PLMN, the second network can be accessed to obtain a service.

Optionally, the UE may determine, based on the information returned by the second network, that is, the DC information, a third network that can be accessed to obtain a service, and complete the network selection process.

FIG. 6 is a schematic flowchart 5 of a network selection method according to an embodiment of this application. As shown in FIG. 6, the method includes the following steps:

Step 600: A UE performs network search, and receives system information of a MIB and a SIB1.

Step 610: An access stratum AS reads a PLMN ID from the SIB1, and sends the PLMN ID to a NAS stratum.

Optionally, the AS obtains related information such as the PLMN ID and measurement information, and obtains the PLMN ID in the information and sends the PLMN ID to the NAS stratum.

Step 620: The UE performs PLMN selection.

Optionally, the NAS may performs PLMN selection based on received PLMN ID(s) and stored PLMN list information, such as a forbidden list.

Step 630*a*: If it is determined that there are Allowable PLMN(s), one Allowable PLMN may be selected from the Allowable PLMN(s) to perform processes such as cell selection.

Step 630*b*: If the PLMN ID(s) received by the NAS are all in the forbidden list, even if there is no Allowable PLMN, whether the UE supports a MINT feature can be determined.

Step 640*a*: If the UE does not support the MINT feature, the UE enters the limited service state.

Step 640*b*: The UE selects a second network.

Optionally, if the UE supports the MINT feature, a PLMN may be selected from the PLMN ID(s) in the forbidden list to serve as the second network.

Step 650: The UE reads DC information broadcast by the second network.

The second network broadcast the DC information. The UE may read the DC information broadcast by the second network.

The information can be broadcast through the MIB, the SIB1, or other SIB information.

Step 660: The UE performs network selection based on the DC information.

Optionally, the UE may perform access control of the forbidden PLMN based on the DC information broadcast by the second network.

Optionally, the UE may determine, based on the DC information returned by the second network, whether the second network can be accessed to obtain a service, for example, when the DC information includes indication information that the second network can provide a data service to the UE of the disastrous PLMN, the second network can be accessed to obtain a service.

Optionally, the UE may determine, based on the information returned by the second network, that is, the DC information, a third network that can be accessed to obtain a service, and complete the network selection process.

FIG. 7 is a schematic flowchart 6 of a network selection method according to an embodiment of this application. As shown in FIG. 7, the method includes the following steps:

Step 700: A disaster occurs on a first network.

Step 710: The first network sends DC information to a UE.

Optionally, the DC information may be transmitted through, but not limited to, the following messages: a NAS message, an AS message, and the like.

Step 720: The UE performs PLMN selection.

If it is determined that there are other allowable PLMN(s), the UE performs normal PLMN selection.

Step 730: The UE performs network selection based on the DC information.

If PLMN(s) searched by the UE are all in a forbidden list, the UE performs PLMN selection based on the received DC information.

Optionally, the UE may determine, based on the DC information, a PLMN list, that is, a network list of third networks that can be accessed to obtain a service, and complete a network selection process based on the PLMN list (the network list of the third networks).

It should be noted that, in the network selection method provided in this embodiment of this application, an execution subject may be a network selection apparatus, or a control module in the network selection apparatus that is configured to perform the network selection method. In embodiments of this application, a network selection apparatus provided in the embodiments of this application is described by using an example in which the network selection apparatus performs the network selection method.

FIG. 8 is a schematic structural diagram 1 of a network selection apparatus according to an embodiment of this application. The apparatus is applied to a terminal, and includes: an obtaining module 810 and a selection module 820.

The obtaining module 810 is configured to obtain, in a case that fault occurs on a first network of the terminal, disaster condition DC information from a target network.

The selection module 820 is configured to perform network selection based on the DC information.

The target network includes: the first network and/or a second network, where the first network is a network that does not exist in a forbidden network list of the terminal; and the second network is a network that exists in the forbidden network list of the terminal.

Alternatively, in a case that fault occurs on the first network of the terminal, the network selection apparatus may obtain the disaster condition DC information from the first network and/or the second network by the obtaining module 810; and then perform network selection based on the DC information by the selection module 820.

It should be noted that, the apparatus provided in this embodiment of this application can implement all method steps implemented by the embodiments of the foregoing network selection method, and can achieve the same technical effects. Details about the parts and beneficial effects in this embodiment that are same as those in the method embodiments are not described herein again.

In the embodiments of this application, in a case that fault occurs on the first network of the terminal, the terminal may obtain the DC information from the first network or the second network in a communication connection in the forbidden network list, to ensure that the terminal can obtain the DC information and perform network selection, thereby improving a success rate of network access.

Optionally, the obtaining module is configured to:

obtain, in a case that networks corresponding to network identifiers obtained from a non-access stratum NAS are all in the forbidden network list of the terminal, and the terminal supports a minimization of service interruption MINT feature, the DC information from the target network.

Optionally, in a case that the target network is the first network, the obtaining module is configured to:

receive the DC information sent by the first network after fault.

Optionally, the DC information is sent through at least one of the following messages: a NAS message; and an AS message.

Optionally, in a case that the target network is the first network and/or the second network, the obtaining module is configured to:

receive the DC information broadcast by the first network and/or the second network.

Optionally, the DC information is sent through at least one of the following messages: a MIB; a SIB1; and other SIB information.

Optionally, in a case that the target network is the second network, the obtaining module is configured to:

send request information to the second network, where the request information is used for requesting the DC information.

Optionally, the request information is sent through at least one of the following messages: a NAS message; and an AS message.

Optionally, the DC information includes:

a list of third networks, where the third networks are networks that support providing a first service to the terminal.

Optionally, in a case that the target network is the second network, the DC information further includes:

first information used for indicating whether the second network supports providing the first service to the terminal.

Optionally, the first service includes any one or a combination of the following:

an emergency service;

a data service;

a voice service; and a video service.

The network selection apparatus in this embodiment of this application may be an apparatus, or may be a component, an integrated circuit, or a chip in the terminal. The apparatus may be a mobile terminal or may be a non-mobile terminal. For example, the mobile terminal may include, but not limited to, the foregoing enumerated types of the terminal 11, and the non-mobile terminal may be a server, a network attached storage (Network Attached Storage, NAS), a personal computer (personal computer, PC), a television (television, TV), a teller machine, a self-service machine, or the like. This is not specifically limited in this embodiment of this application.

The network selection apparatus in this embodiment of this application may be an apparatus with an operating system. The operating system may be an Android (Android) operating system, may be an ios operating system, or may be another possible operating system, and is not specifically limited in the embodiments of this application.

The network selection apparatus provided in this embodiment of this application can implement processes implemented by the method embodiments shown in FIG. 2 to FIG. 8, and achieve the same technical effects. To avoid repetition, details are not described herein again.

FIG. 9 is a schematic structural diagram 2 of a network selection apparatus according to an embodiment of this application. The apparatus is applied to a first network, and includes: a first sending module 910.

The first sending module 910 is configured to send, in a case that fault occurs on the first network of a terminal, DC information to the terminal.

The DC information is used by the terminal to perform network selection in a case that fault occurs on the first network; and the first network is a network that does not exist in a forbidden network list of the terminal.

Optionally, in a case that fault occurs on the first network of the terminal, the network selection apparatus may send the DC information to the terminal by the first sending module 910.

It should be noted that, the apparatus provided in this embodiment of this application can implement all method steps implemented by the embodiments of the foregoing network selection method, and can achieve the same technical effects. Details about the parts and beneficial effects in this embodiment that are same as those in the method embodiments are not described herein again.

In the embodiments of this application, in a case that fault occurs on the first network of the terminal, the first network may actively send the DC information to the terminal, to ensure that the terminal can obtain the DC information and perform network selection, thereby improving a success rate of network access.

Optionally, the first sending module is configured to:

broadcasting the DC information to the terminal.

Optionally, the DC information is sent through at least one of the following messages: a NAS message; and an AS message.

Optionally, the DC information includes:

a list of third networks, where the third networks are networks that support providing a first service to the terminal.

In the embodiments of this application, in a case that fault occurs on the first network of the terminal, the first network may actively send the DC information to the terminal, to ensure that the terminal can obtain the DC information and perform network selection, thereby improving a success rate of network access.

The network selection apparatus in this embodiment of this application may be an apparatus, or may be a component, an integrated circuit, or a chip in the terminal. The apparatus may be a mobile terminal or may be a non-mobile terminal. For example, the mobile terminal may include, but not limited to, the foregoing enumerated types of the terminal 11, and the non-mobile terminal may be a server, a network attached storage (Network Attached Storage, NAS), a personal computer (personal computer, PC), a television (television, TV), a teller machine, a self-service machine, or the like. This is not specifically limited in this embodiment of this application.

The network selection apparatus in this embodiment of this application may be an apparatus with an operating system. The operating system may be an Android (Android) operating system, may be an ios operating system, or may be another possible operating system, and is not specifically limited in the embodiments of this application.

The network selection apparatus provided in this embodiment of this application can implement processes implemented by the method embodiments shown in FIG. 2 to FIG. 8, and achieve the same technical effects. To avoid repetition, details are not described herein again.

FIG. 10 is a schematic structural diagram 3 of a network selection apparatus according to an embodiment of this application. The apparatus is applied to a second network device, and includes: a second sending module 1010.

The second sending module 1010 is configured to send, in a case that fault occurs on a first network of a terminal, DC information to the terminal.

The DC information is used by the terminal to perform network selection in a case that fault occurs on the first network; and the second network is a network that exists in a forbidden network list of the terminal.

Alternatively, in a case that fault occurs on the first network of the terminal, the network selection apparatus may send the DC information to the terminal by the second sending module 1010.

It should be noted that, the apparatus provided in this embodiment of this application can implement all method steps implemented by the embodiments of the foregoing network selection method, and can achieve the same technical effects. Details about the parts and beneficial effects in this embodiment that are same as those in the method embodiments are not described herein again.

In this embodiments of this application, in a case that fault occurs on the first network of the terminal, the second network in a communication connection in the forbidden network list of the terminal may send the DC information to the terminal, to ensure that the terminal can obtain the DC information and perform network selection, thereby improving a success rate of network access.

Optionally, the second sending module is configured to: broadcast the DC information to the terminal.

Optionally, the DC information is sent through at least one of the following messages: a MIB; a SIB1; and other SIB information.

Optionally, the second sending module is configured to: receive request information sent by the terminal; and send the DC information to the terminal based on the request information.

Optionally, the request information is sent through at least one of the following messages: a NAS message; and an AS message.

Optionally, the DC information includes: a list of third networks, where the third networks are networks that support providing a first service to the terminal.

Optionally, the DC information further includes: first information used for indicating whether the second network supports providing the first service to the terminal.

Optionally, the first service includes any one or a combination of the following: an emergency service; a data service; a voice service; and a video service.

In this embodiments of this application, in a case that fault occurs on the first network of the terminal, the second network in a communication connection in the forbidden network list of the terminal may send the DC information to the terminal, to ensure that the terminal can obtain the DC information and perform network selection, thereby improving a success rate of network access.

The network selection apparatus in this embodiment of this application may be an apparatus, or may be a component, an integrated circuit, or a chip in the terminal. The apparatus may be a mobile terminal or may be a non-mobile terminal. For example, the mobile terminal may include, but not limited to, the foregoing enumerated types of the terminal 11, and the non-mobile terminal may be a server, a network attached storage (NAS), a personal computer (PC), a television (TV), a teller machine, a self-service machine, or the like. This is not specifically limited in this embodiment of this application.

The network selection apparatus in this embodiment of this application may be an apparatus with an operating system. The operating system may be an Android (Android) operating system, may be an ios operating system, or may be another possible operating system, and is not specifically limited in the embodiments of this application.

The network selection apparatus provided in this embodiment of this application can implement processes implemented by the method embodiments shown in FIG. 2 to FIG.

8, and achieve the same technical effects. To avoid repetition, details are not described herein again.

Optionally, FIG. 11 is a schematic structural diagram of a communication device according to an embodiment of this application. As shown in FIG. 11, the communication device 1100 includes a processor 1101, a memory 1102, and a program or an instruction stored in the memory 1102 and capable of being run on the processor 1101. For example, in a case that the communication device 1100 is a terminal, the program or the instruction, when executed by the processor 1101, implements the processes of the embodiments of the foregoing network selection method, and the same technical effects can be achieved. In a case that the communication device 1100 is a network side device, the program or the instruction, when executed by the processor 1101, implements the processes of the embodiments of the foregoing network selection method, and the same technical effects can be achieved. To avoid repetition, details are not described herein again.

Figures 12, 13:
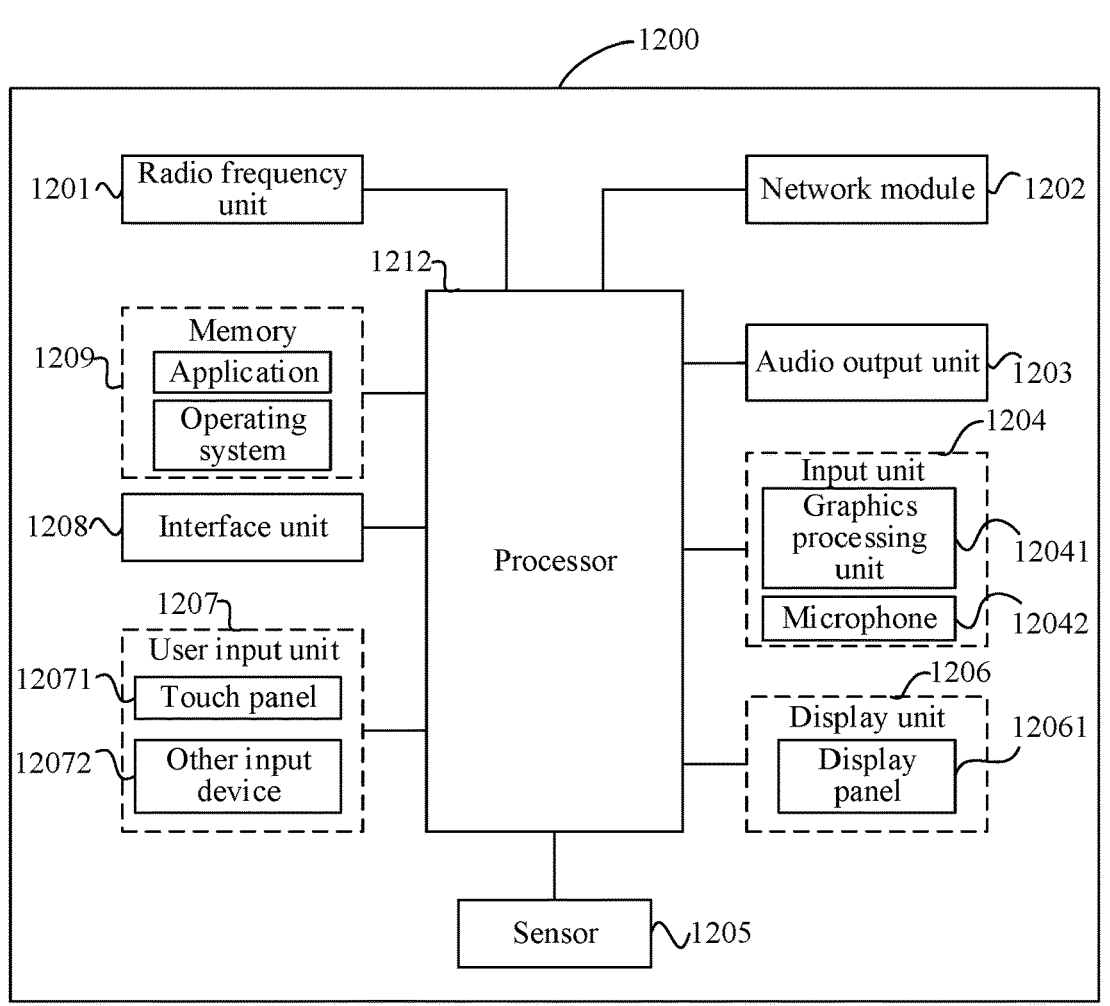
FIG. 12 is a schematic diagram of a hardware structure of a terminal according to an embodiment of this application.
FIG. 13 is a schematic diagram of a hardware structure of a first network device according to an embodiment of this application.

FIG. 12 is a schematic diagram of a hardware structure of a terminal according to an embodiment of this application.

The terminal 1200 includes but is not limited to: components such as a radio frequency unit 1201, a network module 1202, an audio output unit 1203, an input unit 1204, a sensor 1205, a display unit 1206, a user input unit 1207, an interface unit 1208, a memory 1209, and a processor 1210.

A person skilled in the art may understand that, the terminal 1200 may further include a power supply (such as a battery) for supplying power to the components. The power supply may be logically connected to the processor 1210 through a power management system, thereby implementing functions such as charging, discharging, and power consumption management through the power supply management system. The terminal structure shown in FIG. 12 constitutes no limitation on the terminal, and the terminal may include more or fewer components than those shown in the figure, or some components may be combined, or a different component deployment may be used. Details are not described herein again.

It should be understood that, in this embodiment of this application, the input unit 1204 may include a graphics processing unit (GPU) 12041 and a microphone 12042. The graphics processing unit 12041 performs processing on image data of a static picture or a video that is obtained by an image acquisition device (for example, a camera) in a video acquisition mode or an image acquisition mode. The display unit 1206 may include a display panel 12061, the display panel 12061 may be configured in a form such as a liquid crystal display or an organic light-emitting diode. The user input unit 1207 includes a touch panel 12071 and other input devices 12072. The touch panel 12071 is also referred to as a touchscreen. The touch panel 12071 may include two parts: a touch detection apparatus and a touch controller. The other input devices 12072 may include, but not limited to, a physical keyboard, a functional key (such as a volume control key or a switch key), a track ball, a mouse, and a joystick. Details are not described herein again.

In this embodiment of this application, the radio frequency unit 1201 receives information from a correspondent node, then sends the information to the processor 1210, and further sends information to be transmitted to the correspondent node. Generally, the radio frequency unit 1201 includes, but is not limited to, an antenna, at least one amplifier, a transceiver, a coupler, a low noise amplifier, a duplexer, and the like.

The memory 1209 may be configured to store a software program or an instruction and various data. The memory

1209 may mainly include a program storage or instruction area and a data storage area. The program storage or instruction area may store an operating system, an application or an instruction required by at least one function (for example, a sound playing function and an image playing function), or the like. In addition, the memory 1209 may include a cache random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one magnetic disk storage device, a flash storage device, or other non-volatile solid-state storage devices.

The processor 1210 may include one or more processing units. Optionally, the processor 1210 may integrate an application processor and a modem processor. The application processor mainly processes an operating system, a user interface, an application or an instruction, and the like. The modem processor mainly processes wireless communication, such as a baseband processor. It can be understood that, the modem processor may not be integrated into the processor 1210.

The processor 1210 is configured to:

obtain, in a case that fault occurs on a first network of the terminal, disaster condition DC information from a target network; and perform network selection based on the DC information, where the target network includes: the first network and/or a second network, where the first network is a network that does not exist in a forbidden network list of the terminal; and the second network is a network that exists in the forbidden network list of the terminal.

In the embodiments of this application, in a case that fault occurs on the first network of the terminal, the terminal may obtain the DC information from the first network or the second network in a communication connection in the forbidden network list, to ensure that the terminal can obtain the DC information and perform network selection, thereby improving a success rate of network access.

Optionally, in a case that fault occurs on the first network of the terminal, the processor 1210 is configured to:

obtain, in a case that networks corresponding to network identifiers obtained from a non-access stratum NAS are all in the forbidden network list of the terminal, and the terminal supports a minimization of service interruption MINT feature, the DC information from the target network.

Optionally, in a case that the target network is the first network, the processor 1210 is configured to:

receive the DC information sent by the first network after fault.

Optionally, the DC information is sent through at least one of the following messages: a NAS message; and an AS message.

Optionally, in a case that the target network is the first network and/or the second network, the processor 1210 is configured to:

receive the DC information broadcast by the first network and/or the second network.

Optionally, the DC information is sent through at least one of the following messages: a MIB; a SIB1; and other SIB information.

Optionally, in a case that the target network is the second network, the processor 1210 is configured to:

send request information to the second network, where the request information is used for requesting the DC information.

Optionally, the request information is sent through at least one of the following messages: a NAS message; and an AS message.

Optionally, the DC information includes:

a list of third networks, where the third networks are networks that support providing a first service to the terminal.

Optionally, in a case that the target network is the second network, the DC information further includes:

first information used for indicating whether the second network supports providing the first service to the terminal.

Optionally, the first service includes any one or a combination of the following:

an emergency service;

a data service;

a voice service; and a video service.

In the embodiments of this application, in a case that fault occurs on the first network of the terminal, the terminal may obtain the DC information from the first network or the second network in a communication connection in the forbidden network list, to ensure that the terminal can obtain the DC information and perform network selection, thereby improving a success rate of network access.

FIG. 13 is a schematic diagram of a hardware structure of a first network device according to an embodiment of this application.

As shown in FIG. 13, the network side device 1300 includes: an antenna 1301, a radio frequency apparatus 1302, and a baseband apparatus 1303. The antenna 1301 is connected to the radio frequency apparatus 1302. In an uplink direction, the radio frequency apparatus 1302 receives information by using the antenna 1301, and sends the information to the baseband apparatus 1303 for processing. In a downlink direction, the baseband apparatus 1303 processes information to be sent, and sends the information to the radio frequency apparatus 1302. The radio frequency apparatus 1302 processes the received information and sends the information by using the antenna 1301.

The frequency band processing apparatus may be located in the baseband apparatus 1303. The method performed by the network side device in the foregoing embodiments may be implemented in the baseband apparatus 1303. The baseband apparatus 1303 includes a processor 1304 and a memory 1305.

The baseband apparatus 1303 may include, for example, at least one baseband plate. A plurality of chips are disposed on the baseband plate. As shown in FIG. 13, one of the plurality of chips is, for example, the processor 1304, and is connected to the memory 1305, to invoke a program in the memory 1305 to perform network device operations in the foregoing method embodiments.

The baseband apparatus 1303 may further include a network interface 1306, configured to exchange information with the radio frequency apparatus 1302. The interface is, for example, a common public radio interface (common public radio interface, CPRI for short).

Alternatively, the network side device in this embodiment of this application further includes: an instruction or a program stored in the memory 1305 and capable of being run on the processor 1304, where the processor 1304 invokes the instruction or the program in the memory 1305 to perform the method performed by modules shown in FIG. 9, and the same technical effects can be achieved. To avoid repetition, details are not described herein again.

The processor 1304 is configured to:

send, in a case that fault occurs on a first network of a terminal, DC information to the terminal, where the DC information is used by the terminal to perform network selection in a case that fault occurs on the first network; and the first network is a network that does not exist in a forbidden network list of the terminal.

In the embodiments of this application, in a case that fault occurs on the first network of the terminal, the first network may actively send the DC information to the terminal, to ensure that the terminal can obtain the DC information and perform network selection, thereby improving a success rate of network access.

Optionally, the processor 1304 is configured to:

broadcast the DC information to the terminal.

Optionally, the DC information is sent through at least one of the following messages: a NAS message; and an AS message.

Optionally, the DC information includes:

a list of third networks, where the third networks are networks that support providing a first service to the terminal.

Optionally, the first service includes any one or a combination of the following:

an emergency service;

a data service;

a voice service; and a video service.

In the embodiments of this application, in a case that fault occurs on the first network of the terminal, the first network may actively send the DC information to the terminal, to ensure that the terminal can obtain the DC information and perform network selection, thereby improving a success rate of network access.

Figure 14:
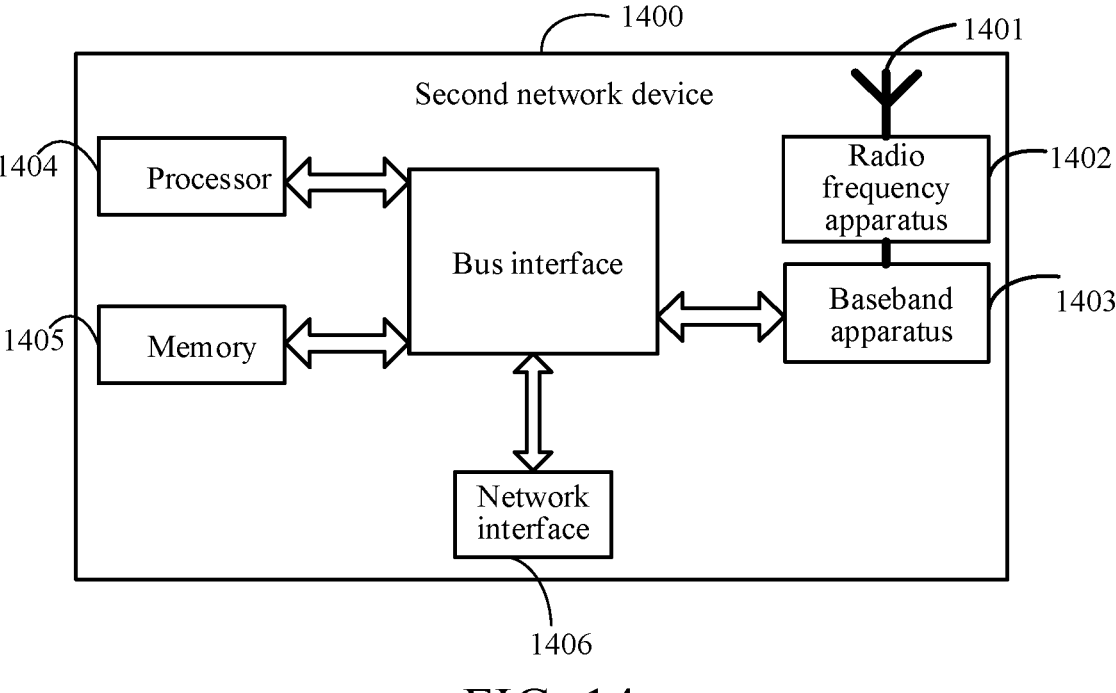
FIG. 14 is a schematic diagram of a hardware structure of a second network device according to an embodiment of this application.

FIG. 14 is a schematic diagram of a hardware structure of a second network device according to an embodiment of this application.

As shown in FIG. 14, the network side device 1400 includes: an antenna 1401, a radio frequency apparatus 1402, and a baseband apparatus 1403. The antenna 1401 is connected to the radio frequency apparatus 1402. In an uplink direction, the radio frequency apparatus 1402 receives information by using the antenna 1401, and sends the information to the baseband apparatus 1403 for processing. In a downlink direction, the baseband apparatus 1403 processes information to be sent, and sends the information to the radio frequency apparatus 1402. The radio frequency apparatus 1402 processes the received information and sends the information by using the antenna 1401.

The frequency band processing apparatus may be located in the baseband apparatus 1403. The method performed by the network side device in the foregoing embodiments may be implemented in the baseband apparatus 1403. The baseband apparatus 1403 includes a processor 1404 and a memory 1405.

The baseband apparatus 1403 may include, for example, at least one baseband plate. A plurality of chips are disposed on the baseband plate. As shown in FIG. 14, one of the plurality of chips is, for example, the processor 1404, and is connected to the memory 1405, to invoke a program in the memory 1405 to perform network device operations in the foregoing method embodiments.

The baseband apparatus 1403 may further include a network interface 1406, configured to exchange information with the radio frequency apparatus 1402. The interface is, for example, a common public radio interface (common public radio interface, CPRI for short).

Alternatively, the network side device in this embodiment of this application further includes: an instruction or a program stored in the memory 1405 and capable of being run on the processor 1404, where the processor 1404 invokes the instruction or the program in the memory 1405 to perform the method performed by modules shown in FIG. 10, and the same technical effects can be achieved. To avoid repetition, details are not described herein again.

The processor 1404 is configured to:

send, in a case that fault occurs on the first network of a terminal, DC information to the terminal, where the DC information is used by the terminal to perform network selection in a case that fault occurs on the first network; and the second network is a network that exists in a forbidden network list of the terminal.

In this embodiments of this application, in a case that fault occurs on the first network of the terminal, the second network in a communication connection in the forbidden network list of the terminal may send the DC information to the terminal, to ensure that the terminal can obtain the DC information and perform network selection, thereby improving a success rate of network access.

Optionally, the processor 1404 is configured to:

broadcast the DC information to the terminal.

Optionally, the DC information is sent through at least one of the following messages: a MIB; a SIB1; and other SIB information.

Optionally, the processor 1404 is configured to:

receive request information sent by the terminal; and send the DC information to the terminal based on the request information.

Optionally, the request information is sent through at least one of the following messages: a NAS message; and an AS message.

Optionally, the DC information includes:

a list of third networks, where the third networks are networks that support providing a first service to the terminal.

Optionally, the DC information further includes:

first information used for indicating whether the second network supports providing the first service to the terminal.

Optionally, the first service includes any one or a combination of the following:

an emergency service;

a data service;

a voice service; and a video service.

In this embodiments of this application, in a case that fault occurs on the first network of the terminal, the second network in a communication connection in the forbidden network list of the terminal may send the DC information to the terminal, to ensure that the terminal can obtain the DC information and perform network selection, thereby improving a success rate of network access.

An embodiment of this application further provides a readable storage medium, where the readable storage medium may be non-volatile, or may be volatile. The readable storage medium stores a program or an instruction, and the program or the instruction, when executed by a processor, implements the processes of the embodiments of the foregoing network selection method, and the same technical effects can be achieved. To avoid repetition, details are not described herein again.

The processor is the processor in the terminal of the foregoing embodiments. The readable storage medium includes a computer-readable storage medium, for example, a computer read-only memory (ROM), a random access memory (RAM), a magnetic disk, or an optical disc.

An embodiment of this application further provides a chip. The chip includes a processor and a communication interface. The communication interface is coupled to the processor. The processor is configured to run a program or instructions to implement all processes of the embodiments of the foregoing network selection method, and the same technical effects can be achieved. To avoid repetition, details are not described herein again.

It should be understood that, the chip mentioned in this embodiment of this application may also be referred to as a system-level chip, a system chip, a chip system, a system-on-chip, or the like.

An embodiment of this application further provides a computer program product, where the computer program product is stored in a non-transitory readable storage medium, and the computer program product is executed by at least one processor to implement the processes of the embodiments of the network selection method, and the same technical effects can be achieved. To avoid repetition, details are not described herein again.

It should be noted that, in this specification, terms "comprise", "include", and any variants thereof are intended to cover a non-exclusive inclusion. Therefore, a process, a method, an object, or an apparatus that includes a series of elements only includes such elements, but also includes other elements not specified expressly, or may include inherent elements of the process, method, object, or apparatus. Without more limitations, elements defined by the sentence "including one" does not exclude that there are still other same elements in the processes, methods, objects, or apparatuses that include such elements. In addition, it should be noted that, the scope of the method and the apparatus in the embodiments of this application is not limited to a shown sequence or a discussed sequence to perform functions, and may further include performing functions in a basically simultaneous manner or a converse sequence based on the involved functions, for example, the described method may be performed in a sequence different from the description, and various steps may be added, removed, and combined. In addition, features described with reference to some examples may be combined in other examples.

Through the foregoing description in the foregoing implementations, a person skilled in the art can clearly learn that the foregoing embodiment methods may be implemented by using software in combination with a necessary universal hardware platform. Certainly, the embodiment methods may be implemented by using hardware, but the former is a better implementation in many cases. Based on such an understanding, the technical solutions of this application essentially or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, a network device, or the like) to perform the methods described in the embodiments of this application.

The embodiments of this application have been described above with reference to the accompanying drawings. This application is not limited to the specific embodiments described above, and the specific embodiments described above are merely exemplary and not limitative. Those of ordinary skill in the art may make various variations under the teaching of this application without departing from the spirit of this application and the protection scope of the claims, and such variations shall all fall within the protection scope of this application.

What is claimed is:

1. A network selection method performed by a terminal, comprising:

obtaining, in a case that fault occurs on a first network of the terminal, first information indicating whether a second network supports providing a first service for the terminal from the second network; wherein the second network is a network that exists in a forbidden network list of the terminal;

the method further comprises: obtaining a list of third networks from the first network; wherein the third networks are networks that support providing the first service to the terminal, and the first network is a network that does not exist in the forbidden network list of the terminal; and performing network selection based on the first information and the list of third networks.

2. The network selection method according to claim 1, wherein the obtaining, in a case that fault occurs on a first network of the terminal, first information from the second network comprises:

obtaining, in a case that networks corresponding to network identifiers obtained from a non-access stratum (NAS) are all in the forbidden network list of the terminal, and the terminal supports a minimization of service interruption (MINT) feature, the first information-from the second network.

3. The network selection method according to claim 1, wherein the obtaining a list of third networks from the first network comprises:

receiving the list of third networks sent by the first network after fault.

4. The network selection method according to claim 3, wherein the list of third networks is sent through at least one of the following messages:

a non-access stratum (NAS) message; or an access stratum (AS) message.

5. The network selection method according to claim 1, wherein the obtaining the first information from the second network comprises: receiving the first information broadcast by the second network;

the obtaining the list of third networks from the first network comprises: receiving the list of third networks broadcast by the first network.

6. The network selection method according to claim 5, wherein the first information and the list of third networks is sent through at least one of the following messages:

a master information block (MIB); a system information block type 1 (SIB1); or other system information block (SIB) information.

7. The network selection method according to claim 1, wherein the obtaining first information from the second network comprises:

sending request information to the second network, wherein the request information is used for requesting the first information.

8. The network selection method according to claim 7, wherein the request information is sent through at least one of the following messages:

a non-access stratum (NAS) message; or an access stratum (AS) message.

9. The network selection method according to claim 1, wherein the first service comprises any one or a combination of the following:

an emergency service;

a data service;

a voice service; and a video service.

10. A terminal, comprising:

a memory, configured to store a program or an instruction; and a processor, wherein the program or the instruction, when executed by the processor, causes the terminal to:

obtain, in a case that fault occurs on a first network of the terminal, first information indicating whether a second network supports providing a first service for the terminal from the second network; wherein the second network is a network that exists in a forbidden network list of the terminal;

the program or the instruction, when executed by the processor, causes the terminal further to: obtain a list of third networks from the first network; wherein the third networks are networks that support providing the first service to the terminal, and the first network is a network that does not exist in the forbidden network list of the terminal; and perform network selection based on the first information and the list of third networks.

11. The terminal according to claim 10, wherein the program or the instruction, when executed by the processor, causes the terminal to:

obtain, in a case that networks corresponding to network identifiers obtained from a non-access stratum (NAS) are all in the forbidden network list of the terminal, and the terminal supports a minimization of service interruption (MINT) feature, the first information from the second network.

12. The terminal according to claim 10, wherein the program or the instruction, when executed by the processor, causes the terminal to:

receive the list of third networks sent by the first network after fault.

13. The terminal according to claim 12, wherein the list of third networks is sent through at least one of the following messages:

a non-access stratum (NAS) message; or an access stratum (AS) message.

14. The terminal according to claim 10, wherein the program or the instruction, when executed by the processor, causes the terminal to:

send request information to the second network, wherein the request information is used for requesting the first information.

15. The terminal according to claim 14, wherein the request information is sent through at least one of the following messages:

a non-access stratum (NAS) message; or an access stratum (AS) message.

16. The terminal according to claim 10, wherein the first service comprises any one or a combination of the following:

an emergency service;

a data service;

a voice service; and a video service.

17. A non-transitory readable storage medium storing a program or an instruction, wherein the program or the instruction, when executed by a processor of a terminal, causes the terminal to perform:

obtaining, in a case that fault occurs on a first network of the terminal, first information indicating whether a second network supports providing a first service for the terminal from the second network; wherein the second network is a network that exists in a forbidden network list of the terminal;

obtaining a list of third networks from the first network; wherein the third networks are networks that support providing the first service to the terminal, and the first network is a network that does not exist in the forbidden network list of the terminal; and performing network selection based on the first information and the list of third networks.

18. The non-transitory readable storage medium according to 17, wherein the terminal further performs:

obtaining, in a case that networks corresponding to network identifiers obtained from a non-access stratum (NAS) are all in the forbidden network list of the terminal, and the terminal supports a minimization of service interruption (MINT) feature, the first information from the second network.

19. The non-transitory readable storage medium according to 17, wherein the terminal further performs:

receiving the list of third networks sent by the first network after fault.

20. The non-transitory readable storage medium according to 19, wherein the list of third networks is sent through at least one of the following messages:

a non-access stratum (NAS) message; or an access stratum (AS) message.

* * * * *